United States Patent
Overberg et al.

(10) Patent No.: US 6,385,210 B1
(45) Date of Patent: May 7, 2002

(54) METHOD FOR DETECTING AND RESOLVING DATA CORRUPTION IN A UART BASED COMMUNICATION NETWORK

(75) Inventors: Karl William Overberg, Brighton; Clifford Lester Merz, Ann Arbor, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/062,080

(22) Filed: Apr. 17, 1998

(51) Int. Cl.[7] .............................. H04L 12/413
(52) U.S. Cl. ................. 370/447; 370/461; 370/462
(58) Field of Search .................. 370/320, 321, 370/445, 444, 451, 447, 461, 462

(56) References Cited

U.S. PATENT DOCUMENTS

| | | | |
|---|---|---|---|
| 4,063,220 A | * 12/1977 | Metcalfe et al. | 370/462 |
| 4,560,985 A | * 12/1985 | Strecker et al. | 340/825.5 |
| 4,706,082 A | * 11/1987 | Miesterfeld et al. | 340/825 |
| 4,707,828 A | * 11/1987 | Yamada | 370/447 |
| 4,715,031 A | 12/1987 | Crawford et al. | |
| 4,764,920 A | * 8/1988 | Furuya | 370/437 |
| 5,001,642 A | * 3/1991 | Botzenhardt et al. | 364/431.12 |
| 5,230,044 A | * 7/1993 | Cao et al. | 395/325 |
| 5,265,093 A | * 11/1993 | Dissosway et al. | 370/327 |
| 5,311,512 A | 5/1994 | Bartis et al. | |
| 5,574,949 A | * 11/1996 | Tsurumi | 395/850 |
| 5,619,530 A | 4/1997 | Cadd et al. | |
| 6,111,888 A | * 8/2000 | Green et al. | 370/461 |

* cited by examiner

Primary Examiner—Alpus H. Hsu
Assistant Examiner—Thien D Tran
(74) Attorney, Agent, or Firm—Jennifer M. Stec

(57) ABSTRACT

A method for communicating information between networked UARTs to achieve reliable peer to peer communication. A negative acknowledgment (NACK) signal is generated in the event that message corruption is detected by a node on the network to flag the message corruption and generates a signal which is guaranteed to corrupt the message in progress by overwriting the stop bit of the UART character frame. This causes all receivers of the message in progress to cancel reception of a corrupted message and causes transmitters to retry transmission of the message. The invention does not impose any limits on the number of nodes on the network and does not require any special data content other than a unique source address that is assigned to each node on the network.

18 Claims, 4 Drawing Sheets

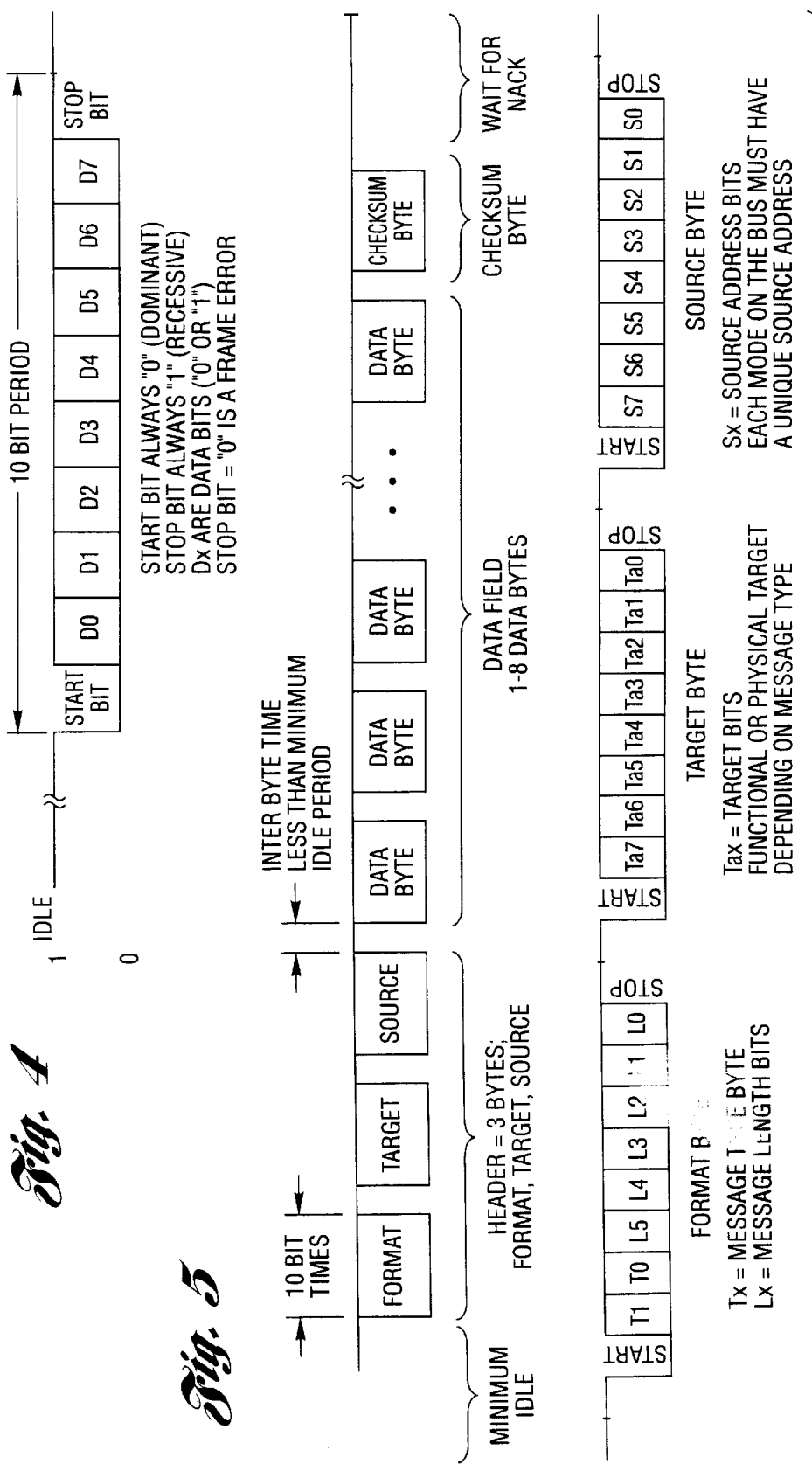

US 6,385,210 B1

METHOD FOR DETECTING AND RESOLVING DATA CORRUPTION IN A UART BASED COMMUNICATION NETWORK

TECHNICAL FIELD

This invention relates to communication networks and more particularly to a method and apparatus for detecting and resolving collisions and noise corruption in a Universal Asynchronous Receiver Transmitter (UART) based peer to peer communication network.

BACKGROUND ART

Historically electrical and electronic functions in vehicles have been implemented with individual Electronic Control Units (ECU's) which perform separate, independent functions. For example, a vehicle system might include one ECU for engine control functions, another ECU to perform anti-lock brake functions, and yet another ECU to control the instrument cluster. As vehicle electronic architectures have evolved, it has become necessary for ECU's to communicate with each other in order to realize desirable vehicle system features such as the following:

1. Distributed vehicle functions via coordination between separate ECU's;
2. Sharing of related data between ECU's; and
3. Access to diagnostic data of multiple ECU's via a single, common interface.

An example of the first feature would be a vehicle traction control system, which involves coordination between a powertrain controller and an Anti-Lock Brake System (ABS) controller. An example of the second feature would be communication of engine coolant temperature data from the powertrain ECU to the instrument cluster ECU for display by the instrument cluster. The third feature mentioned above allows a single diagnostic connection to a bus or network to access a multiplicity of modules for diagnostic information or to exercise diagnostic functions in a vehicle without having to connect to each ECU separately.

Communication between ECU's in vehicles has been realized with a variety of solutions. Several CARRIER SENSE MULTIPLE ACCESS/COLLISION DETECT/ ARBITRATE (CSMA/CD/A) protocols have been designed and are being used in vehicles, including the ISO9141 standard, otherwise known as Controller Area Network (CAN), and SAE J1850 standards, including the J1850 PWM and VPW implementations. These protocols must be implemented by custom integrated circuits which are designed specifically to adhere to the stated protocol. As arbitration based protocols, these protocols require message transmissions to synchronize to and arbitrate with each other on a bit by bit basis such that message collisions on the bus are not destructive to the dominant message. However, the fact that custom integrated circuits are required to implement these communication protocols implies an associated cost for the protocol controller.

An alternative to using custom integrated circuits is to use a UART (Universal Asynchronous Receiver Transmitter) to implement a peer to peer communication network between ECU's, as shown in FIG. 1. The ECU's used in vehicles are almost exclusively micro-controller based designs. The UART is a micro-controller peripheral which is widely available for a large variety of micro-controller families and is less complex and less costly than custom integrated solutions for CSMA/CD/A communication protocols. However, UARTs are most commonly used as solutions for point to point communication between ECU's on a common network, where communication is coordinated by a single bus "master" on the network, with the remaining nodes acting as "slaves".

Peer to peer communication networks are typically not implemented using UARTs, for the following reasons; 1.) UARTs are not able to synchronize to signals already present on the bus. When the UART is commanded to transmit a character, it transmits the character independent of what signal is on the bus. 2.) UARTs are not able to bit-wise arbitrate; once the UART begins transmission of a character, the character is completely transmitted. 3.) Collisions between multiple nodes transmitting on a UART based peer to peer communication network can result in distorted waveforms which cause data to be received and interpreted differently by different nodes on the bus.

The collision problem associated with prior art use of UARTs in peer to peer communication networks will be apparent from the following discussion with respect to FIG. 2. In this case, two nodes have initiated message transmissions asynchronously, with half a bit period of phase shift between them. The resulting waveform on the bus, which is a composite of the signals driven onto the bus by the two individual nodes, causes data transitions to occur exactly at the receiving UART sample points which have been projected from the first edge of the start bit. Data samples (circled arrows) taken during data transitions are undefined and result in correspondingly unreliable data messages. As UARTs are not capable of bit-wise arbitration, it is not possible to develop a CSMA/CD/A protocol using them.

In addition to the data collision problem, the vehicle environment is an extremely noisy electrical environment with respect to both radiated and conducted noise sources which further reduces the reliability and integrity of data transmissions.

SUMMARY OF THE INVENTION

In accordance with the present invention, a multiple ECU communication method is provided that utilizes micro-controller UARTs to achieve reliable peer to peer communication. The communication method utilizes a defined message format and a multiplicity of checks on the integrity of individual characters and on the integrity of the complete message relative to the defined message format to achieve reliable data transmission and reception between nodes. The method utilizes a software mechanism for generating a negative acknowledgment (NACK) signal which, in the event that message corruption is detected by any one node on the network, flags the message corruption and generates a signal which is guaranteed to corrupt the message in progress. This causes all receivers of the message in progress to cancel reception of a corrupted message and causes transmitters to retry transmission of the message. This negative acknowledgment technique takes advantage of the frame format checking inherent to UARTs by overwriting the stop bit of the UART character frame.

The method described herein is equally effective in detecting and rejecting corruption of messages in a UART based system which have been corrupted either due to data collisions by multiple transmitters on the network or due to noise corruption resulting from conducted or radiated noise sources. The noise rejected may either be global noise (detected by all receivers on the network) or local noise (detected by only one transmitter or receiver on the network). The method defined by this invention does not impose any limits on the number of nodes on the network and does not require any special data content other than a unique source address that is assigned to each node on the network.

BRIEF DESCRIPTION OF THE DRAWINGS

FIG. 4 shows the character frame format used by the present invention;

FIG. 5 shows the message format used by the present invention;

FIG. 6 shows details of the message header format.

DETAILED DESCRIPTION OF PREFERRED EMBODIMENT

Figure 3:
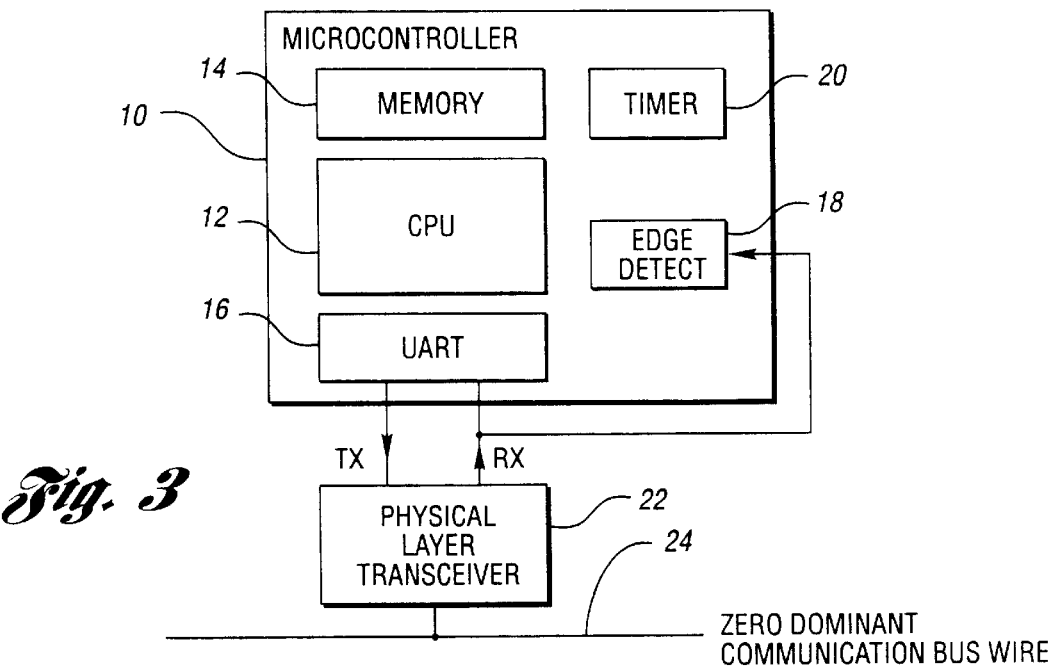
FIG. 3 is a detailed block diagram of one of the ECU's of FIG. 1.

Referring now to the drawings, and initially to FIG. 3, the communication system of the present invention includes a plurality of micro-controllers generally designated 10 each comprising a CPU 12, associated memory 14 storing the software state machine, a UART peripheral 16, an edge detect input 18 and a timer 20. A physical layer transceiver 22 connects the UART 16 with a zero dominant bus 24.

UART implementations vary from micro-controller to micro-controller. For example, some but not all UARTs include information as to whether a byte reception is in progress (bus not idle). Some but not all UARTs allow two bytes to be queued and transmitted in "back to back" fashion. Some but not all UARTs allow a "Break" signal to be sent directly, which causes a frame error to be detected in receiving UARTs. The protocol of the present invention has been designed to work with the simplest UARTs available in common, low end commercial micro-controllers and does not require any special UART features. The present invention operates at a standard bit rate of 9,600 bits/second and all UARTs on the bus are programmed to operate at the same bit rate, with a tolerance of +/-2%. However, these principles are readily extensible to other bit rates, as long as all UARTs on the bus are operating at the same bit rate.

The timer 20 is used to measure the idle period between received bytes and to determine whether or not the bus is idle. The timer is also used to reserve a period after completion of message transmission or message reception during which occurrence of a NACK on the bus negates the successful completion or reception of a message.

The edge detect input 18 is a separate input to the micro-controller which sets a bit when a logic 1 to logic 0 transition occurs on the bus. The purpose of this input is to minimize the number of collision events which occur on the bus and thereby increase effective bus bandwidth. The protocol is functional without the edge detect input, but the edge detect feature allows a node to determine if there is any activity on the bus just prior to transmitting a character. If the bus is not idle, a node about to transmit defers its transmission until the bus becomes idle again. Some UARTs include a status bit which indicates that a byte transmission is in progress. For such UARTs, this status bit may be used for detecting if the bus is busy and an edge detect input would not be needed.

The bus 24 is at one of two logic levels or states; 0 and 1. The bus is a zero dominant bus in that if two transmitters are simultaneously attempting to drive opposite states onto the bus, the 0 state is the dominant state on the bus. Each of the processors on the bus communicates in a half-duplex mode and simultaneously receives the composite signal on the bus at the same time that it is driving signals onto the bus. The purpose of the physical layer transceiver device 22 is to convert the logic state of the bit being transmitted by the UART to an analog signal with impedance characteristics compatible with the zero dominant nature of the bus. The physical layer transceiver actively drives logic 0 signals onto the bus (low impedance) and passively drives logic 1 signals (high impedance) onto the bus.

Communication in the UART Based Protocol(UBP) is effected via messages. Messages are groups of characters which are transmitted one at a time by the UART. The character format used in UBP is a standard 10 bit frame, as shown in FIG. 4. The first bit is a start bit, which is identified by a recessive 1 to dominant 0 transition. The next 8 bits are data bits, which comprise the byte value of the character being transmitted. The 10th bit is a stop bit, which is 1 bit period of a recessive 1 state. Receiving UARTs synchronize to the first start bit edge and project the individual bit sample points based on the first edge of the start bit. If the stop bit is sampled as a dominant 0, a receiving UART identifies this condition as a character frame format error. Hereinafter, the characters transmitted by the UART will be referred to synonymous with bytes, in that a character consists of a start bit, a byte value, and a stop bit.

Characters belonging to the same message have an inter-character separation time which must not exceed a specified idle period of 10 bit times. If the inter-character separation time exceeds 10 bit times for two consecutively received characters, the characters are assumed to belong to separate messages. Messages transmitted according to UBP combine characters into a message format as shown in FIG. 5. Each message includes a mandatory three byte header, a data field of from 1 to 8 data bytes, and a checksum byte. Messages are separated by a minimum period of 51 bit times, which is needed to allow nodes to determine if any other node in the system has declared a message to be invalid by transmitting a NACK.

The header consists of three unique bytes, shown in FIG. 6. The first byte is a format byte, the second byte is a target byte, and the third byte is the source byte. The first two bits of the format byte specify the message type. The two message type bits allow for four possible message types, although in UBP two message types are defined; functionally addressed messages (first two bits 00 binary) and physically addressed messages (first two bits 10 binary). The next 6 bits of the format byte specify the number of data bytes to be transmitted in the message; the possible values are 1 to 8.

The second byte is a target byte. In the case of functionally addressed messages, if the target byte received by a node matches a pre-defined list of functional target bytes defined for that node, then the message is to be received. If the message is a physically addressed message, the message is received if the target byte matches the receiving node's source address. The third byte is the source byte, which corresponds to the unique address of the node which is the source of the transmitted message. The data field consists of 1 to 8 data bytes. The data bytes are followed by the checksum byte. The checksum byte represents the arithmetic sum of all the byte values in the message, from the format byte to the last data byte, calculated modulo 255.

Another character which may be sent by any or all nodes in the system in the event an error is detected is a "Break" character. This character is also referred to as a "Negative Acknowledgment" or "NACK". The NACK character is defined as at least 10 bit periods of a dominant 0 state transmitted by a node on the network. The significance of the "Break" or "NACK" character is that its transmission is guaranteed to cause a character frame format error to be detected by any receiver on the bus. The reason for this is that transmission of 10 bit periods of a dominant state will cause a receiver to interpret a stop bit as dominant, even if a character transmission is already in progress at the time the NACK is transmitted. The NACK as defined and implemented in this protocol allows a UART based peer to peer communication protocol to achieve a high level of data integrity and to operate correctly, regardless of collision or noise events.

Since some UARTs are not capable of transmitting a Break signal directly, the NACK signal is created in software in conjunction with the timer of the micro-controller dedicated to implementing this protocol; In all UART designs which have been evaluated by the applicants, the UART functionality may be disabled and the TX and RX pins may be controlled directly as micro-controller port pins. The Break signal begins by setting the TX pin output to the state which causes a dominant signal to be driven onto the bus, and setting the micro-controller timer for 10 bit periods from the current time. When the timer expires, the TX pin output state is switched such that a recessive state is put onto the bus.

The protocol implementation described herein minimizes the occurrence of collisions via the edge detect input 18. Before any byte is transmitted by any transmitter on the network, the edge detect input is checked to see if any other node on the network has begun transmission of a byte. This approach minimizes the number of collisions, but not all collisions can be anticipated. In the event that messages are simultaneously being transmitted by two (or more) nodes on the network, collisions are detected by multiple checks on the data integrity of the message and resolved immediately by transmission of a NACK.

Each transmitter simultaneously receives and checks each byte as it is transmitted on the bus. The received byte is compared to the byte the transmitting node just loaded into its UART and transmitted. The transmitting node transmits a NACK, to indicate detection of a collision, for either of two cases; 1) the received byte is not the same value as the transmitted byte or 2) the received byte has a frame format error (i.e. the recessive 1 stop bit has been overwritten to a dominant 0). The effect of the NACK is to guarantee that all nodes on the bus detect a frame error and terminate transmission and/or reception of any message in progress. This collision check and transmission of a NACK if an error is detected is performed on every byte transmitted by a transmitter, including the format byte, the target byte, the source byte, the data bytes and the checksum byte.

Figure 1:
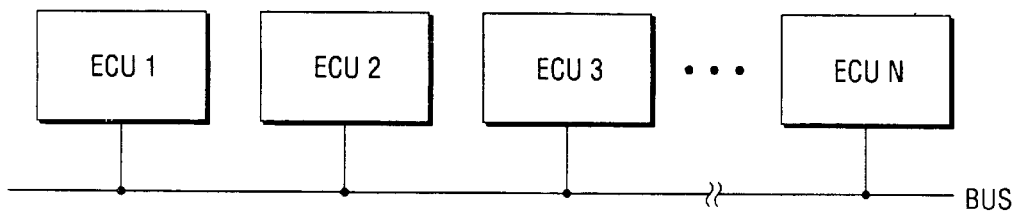
FIG. 1 is a block diagram of the multiple ECU based communication system of the present invention.
Figure 2:
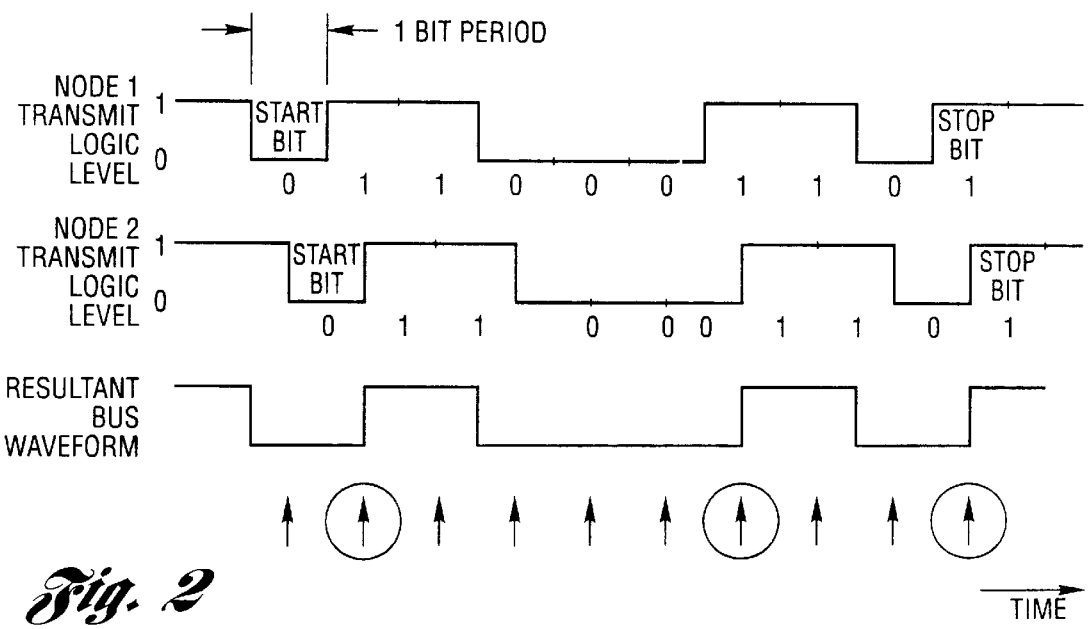
FIG. 2 shows waveforms depicting data uncertainty resulting from asynchronous collisions on a UART based network.

The present invention checks the data integrity of the messages transmitted on the bus by transmitting a NACK when any one node on the bus detects an error. One possible means of resolving collisions after detection of a discrepancy is to simply have the transmitter which detected the discrepancy "back off" and simply stop transmitting. This approach allows a transmitter which does not detect an error, even after a collision, to continue transmitting. The problem with such an approach is the uncertainty of received data associated with the case shown in FIG. 2. When two message transmissions collide and the resultant waveform causes data transitions to occur exactly at a receiver's sample point, it is possible for different receiving nodes on the bus to receive and interpret the same waveform differently. Transmission of the NACK by any one node which detects a collision or any discrepancy in a received waveform guarantees that the waveform on the bus, possibly corrupted due to a collision, is not allowed to continue to be received by other nodes on the network and is forced to be re-transmitted by the transmitting nodes.

For the majority of cases, collisions on the bus are detected after collision of the first character. Messages of differing types, lengths and targets typically result in a detectable collision after the first two bytes of the message are transmitted. However, by the third byte of the message, almost all collisions are detected. As mentioned, every node on the bus is assigned a unique address. As this address is represented by a single byte value, node address values may be in the range of 0 to 255, with up to 256 nodes allowed on the bus. There are no restrictions on the address values assigned to each node, other than the requirement that each node address on the bus must be unique. The fact that each node address is unique guarantees that in most cases, collisions are resolved after transmission of the source byte. However, for the case shown in FIG. 2, where data transitions occur at sample points, unique source addresses do not always guarantee collision detection after the source byte. It is possible, due to the uncertainty attributable to data transitions at the sample point, that two different transmitters receive byte values equal to the value they have transmitted and continue to transmit, even after the source byte.

Whereas checking of each received byte by each transmitter and transmission of a NACK to resolve collisions is the primary mechanism for detecting and resolving collisions, additional detection and resolution mechanisms are incorporated into the protocol. Any node on the UBP bus will transmit a NACK and terminate any message in progress for any of the following reasons:

1. Detection by a transmitter of discrepancy between transmitted and received byte;
2. Detection by a receiver of a frame error for any received byte;
3. Detection by a receiver that the number of received bytes is greater than the data length code;
4. Detection by a receiver of a transmit timeout, i.e. the number of received bytes is less than the data length code; and
5. Detection by a receiver of an invalid checksum.

While not every node on the UBP network at any given time is a transmitter, every node on the UBP network is a receiver, even if the node is transmitting. Every node on the UBP bus receives and checks each message transmitted on the bus. If any node detects a frame error, i.e. a dominant stop bit, a NACK is transmitted by that node. The format byte, the first byte of the message, specifies the number of data bytes in the message. A receiving node knows which received byte to interpret as the checksum byte based on the data length code portion of the received format byte. If an additional byte is received within the minimum idle time of 10 bit times after reception of the checksum byte, the receiving node detects a message format error and transmits a NACK to cancel reception of the current message for all nodes on the network. Similarly if a receiving node receives fewer data bytes than indicated by the data length code, an error is detected and a NACK is transmitted by the receiving node. Finally, a checksum is calculated by all receiving nodes and compared to the checksum received on the bus.

Any discrepancy in the checksum causes the node receiving the checksum to transmit a NACK and terminate the message in progress.

Reception of a NACK by any receiver within a message frame format causes the message in progress to be terminated and not received. Reception of a NACK by any transmitter causes the message transmission to terminate. Transmitted messages are retried 10 times before the transmit attempt is abandoned. Messages in this protocol have no prioritization. The first message attempt is transmitted at the minimum delay of 51 bit times since the previous message. Subsequent attempts are given a random delay of between 0 to 15 bit times to attempt to minimize collision events when two or more nodes are vying for access to the network.

If only one node detects an error and transmits a NACK, other nodes interpret the first NACK as an error and transmit a NACK in response. In order to prevent NACKs from being "ping ponged" between nodes indefinitely, transmission of a NACK by any node on the network is limited to one NACK transmission per message event. Additionally, each node maintains error counters which increment each time a NACK is transmitted and is decremented each time a message is successfully received. If the error counter reaches a pre-defined limit, the node is taken off the bus and not allowed to communicate until the micro-controller re-initializes the software driver. This is to prevent faulty nodes on the bus from disrupting communication on the bus indefinitely.

In addition to collision detection and resolution, all the mechanisms described herein are also used to detect the effects of extraneous noise, both global on the bus (common to all nodes) and/or local to an individual receiver or receivers. In the same sense that data collisions on the bus can cause message corruptions, conducted and radiated noise sources also corrupt messages. All five message corruption detection mechanisms described above for transmitters and receivers also apply to message noise corruptions. Detection of a noise induced discrepancy between a transmitted and received byte by the transmitter, and message corruptions detected by receivers including frame format errors, message length errors, and checksum errors all result in transmission of a NACK by the node or nodes detecting the error and termination of the message in progress for all nodes on the network.

Figure 7:
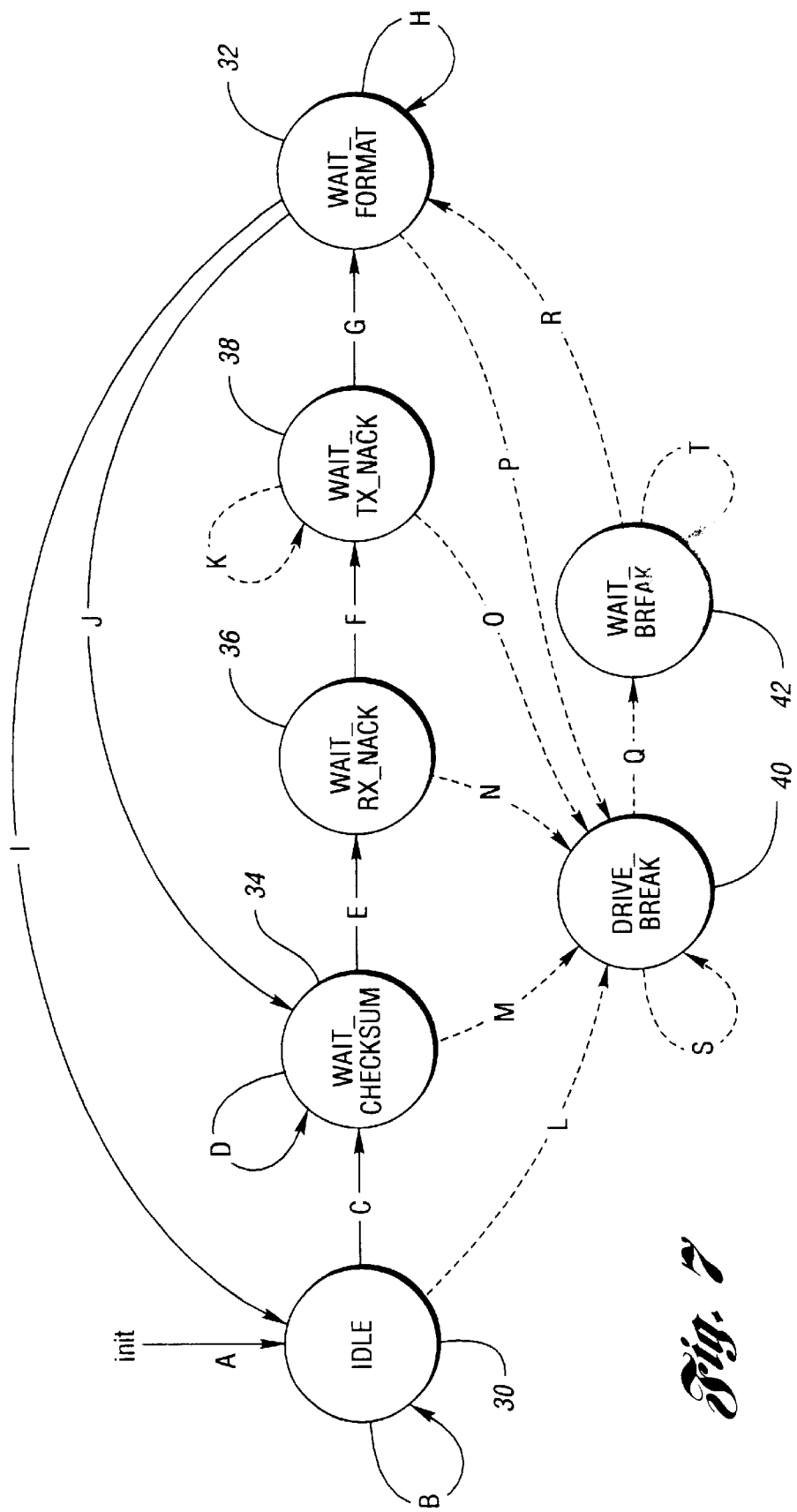
FIG. 7 is a state diagram showing the transmitter/receiver software state machine.

The transmitter/receiver software state machine is shown in FIG. 7. The state machine responds to the hardware components on the micro-controller including the UART, the edge detect input and the timer. The possible states of the state machine are an Idle state 30; a Wait_Format State 32; a Wait_Checksum State 34; a Wait_RxNACK State 36; a Wait_TxNACK State 38; a Drive_Break State 40; and a Wait_Break State 42. A description of the these states follows.

Idle

The Idle state 30 corresponds to lack of activity on the bus for a minimum period of time, "Max_Idle". The significance of the Idle state is that if a message transmission is requested by the application, the message transmission attempt commences immediately. Additionally, during the Idle state, timer interrupts are repeatedly scheduled using the maximum period of the timer 20 to determine when a 1 second period has elapsed without any bus activity. The importance of the 1 second period is to notify "sleeping" applications, that is applications which remain powered in a low quiescent current state during ignition key off, to enter the sleep mode. When the application enables the UBP driver code, the UBP state machine is placed in the Idle state.

Wait_Format

The Wait_Format state 32 is an interim state between completion of a message on the bus and the Idle state. Nodes may attempt to transmit during the Wait_Format state. The time at which a node begins its transmission attempt while in this state must be scheduled relative to a Timer Reference, last established at reception of the checksum byte of the previous message on the bus. The minimum time that a node must wait to begin to transmit from the Timer Reference is a "Min_TWI" interval, which is the Minimum Transmit Wait Interval. This interval is defined to guarantee that all nodes on the bus have advanced to the Wait_Format state and are ready to accept the first byte of a message. This minimum interval must take into account the worst case stack up of allowable application interrupt latencies for each node on the bus as well as worst case oscillator tolerances associated with each node on the bus.

Wait_Checksum

The Wait Checksum state 34 is the state in which the remainder of the bytes in the message up to and including the checksum byte are received by a node. If a node is a transmitter, while in this state the node simply checks a received byte to make sure it is the same as the byte previously transmitted. Any discrepancy causes generation of a Break signal. If a node is a receiver, the first byte of the received message, the format byte, includes a data length code, and so a receiver is able to determine how many message bytes to receive before identifying a received byte as a checksum byte. As each message byte is received, a checksum byte is computed. When the checksum byte is received, it is compared to the computed checksum. Any discrepancy result is in transmission of a Break or NACK (Negative ACKnowledgment) signal.

Upon each reception of a message byte, each node schedules a timer interrupt for 20 Bit Times from the time the byte is received. If the transmitter and receiver are both functioning properly and if the interrupt latency requirement for both the transmitter and the receiver on the bus is being met, the next transmitted byte on the bus should be received within 20 Bit Times. This 20 Bit Time budget includes 7 Bit Times maximum allowable interrupt latency, a 3 Bit Time budget to process the received interrupt, and the 10 Bit Time character length of each UBP character. If a timer interrupt occurs before an expected byte is received, an error condition is interpreted and a Break signal is transmitted.

Wait_RxNACK The Wait_RxNACK state 36 is the next state defined after successful reception of the checksum byte. After the checksum byte is received, a timer interrupt is scheduled for 20 Bit Times from the time the checksum byte has been received. The purpose of this state is to allow for the possibility that the format byte, and more specifically the data length code incorporated into the format byte, has been corrupted by noise or by a collision. If a receiver is expecting more bytes in a message than the transmitter is transmitting, sufficient time must be allowed for the 20 Bit Time timer interrupt to occur and for the receiving node to send a Break signal and have it recognized by the transmitter in time to transmit the message again. The 20 Bit Time interval takes into account the worst case stack up of maximum allowable interrupt latencies as well as worst case oscillator tolerance.

Corruption of the data length code by noise or by a collision on the bus may also cause a receiver to expect fewer bytes than are actually being transmitted by a transmitter. During this state, a receiver is not expecting any received bytes, and so if a byte is received during this state, a Break signal is sent and the received message is ignored. Under normal conditions, no byte is received during this state and the timer interrupt occurs as scheduled 20 Bit Times after reception of the checksum byte. If all other message checks have been properly satisfied, the timer interrupt which occurs during this state causes the received message to be accepted and passed on to the host application.

Wait_TxNACK

The Wait_TxNACK state 38 allows sufficient time for Break signals sent by receiving nodes to be received and recognized by the transmitting node before it declares a message to be successfully transmitted. Receiving nodes may only transmit a Break up to and including the Wait_RxNACK state. In the Wait_TxNACK state, receivers have already declared received messages as valid, and so reception of any byte, either valid or with a frame error, is simply ignored by the receiving node. However, if a transmitting node receives a NACK during this state, which may have been initiated by a receiver in its Wait_RxNACK state but does not complete and is not received by the transmitter until its Wait_TxNACK state, the transmitter assumes the message was not received successfully and retransmits the message.

It should be noted that in the case of multiple receivers of a given message, it is possible for some receivers to declare a message as successfully received whereas other receivers do not and send a Break, which forces the transmitter to retransmit the message. Retransmission of the message implies that some receivers may receive a given message more than once. For this reason, messages which include "relative commands", such as increment or decrement, may produce different results in different receivers and should be avoided, particularly for messages with multiple receivers. A basic design premise in defining UBP is that a transmitter never assumes it has successfully transmitted a message when in fact it was not successfully received by a receiver, i.e. no missing received messages. It is, however, acceptable for a receiver to receive the same message more than once.

There are only two events in UBP which cause transition from one UBP state to another; 1) a UART receive interrupt and 2) a timer interrupt. UBP feeds the receive input from the physical layer transceiver 22 to an edge detect input; this input is used to check for bus activity prior to transmission of a byte but is not associated with an interrupt. In order for the state transition diagram to be considered comprehensive, the occurrence of either of these two events must be considered for each and every state.

The UBP state diagram shown in FIG. 7 includes states and transitions which are considered to be "normal", i.e. associated with successful message transmission and reception, as well as "error" states and transitions, which occur as a result of message collisions, noise, or host application interrupt latencies which exceed the maximum allowed for successful implementation of UBP. In the diagram of FIG. 7, the state transitions which are shown with solid lines are considered paths which are traversed for normal communication and the state transitions which occur as a result of error modes are shown as dashed lines. The following is a description of all the possible state transitions which may occur and a description of the qualifying event and conditions as well as the actions taken as a result of the particular state transition.

---

NORMAL PATHS

A. Initialization

Current State: Undefined
Event: Initialization by Application (Call to "nadinit")

-continued

Next State: Idle
Actions: Schedule Timer Interrupt for Maximum Delay

B. Idle Interrupt in Idle State

Current State: Idle
Event: Timer Interrupt
Next State: Idle
Actions:
    Clear Timer Interrupt
    IF (Message Waiting to Transmit)
    {
        IF (Not at Error Limit)
        {
            IF (Edge Detect Not Set)
            {
                IF (Retry Attempt < Retry Limit)
                {
                    Transmit the Format Byte
                    Initialize the Transmit Checksum
                    Set "Transmitting Current Message" Flag
                }
                ELSE
                    Report Retry Limit Reached to Application
            }
            ELSE
            {
                Set Timer Reference to Current Time
                Set Timer Interrupt for 10 Bit Times from Current Time
            }
        }
    }
    ELSE
    {
        IF (Idle Time > 1 Second)
            Set "Idle for 1 Second" Flag
        ELSE
            Set Timer for Maximum Delay
    }

C. Valid Format Byte Received in Idle State

Current State: Idle
Event: Valid Format Byte Received
Next State: Wait_Checksum
Actions:
    Set Timer Reference to Current Time
    Clear the Input Capture Flag
    IF (Transmitting Current Message)
    {
        IF (Received Byte = Format Byte Transmitted AND Input Capture Flag Clear)
        {
            Transmit Target Byte
            Increment Pointer to Next Byte to Transmit
            Add Target Byte to Transmit Checksum
        }
    }
    ELSE
    {
        Save Received Format Byte
        Initialize Receive Checksum
    }
    Set Timer Interrupt for 20 Bit Times from Timer Reference D. Valid Message Byte (Not the Checksum)

Received in Wait Checksum State
Current State: Wait$_{13}$ Checksum
Event: Valid Message Byte Received
Next State: Wait_Checksum
Actions:
    Set Timer Reference to Current Time
    Clear the Input Capture Flag
    IF (Transmitting Current Message)
    {

-continued

```
        IF (Received Byte = Last Byte Transmitted AND
              Input Capture Flag Clear)
        {
            IF (Next Byte to Transmit is a Message
                  Byte)
            {
                Transmit Next Message Byte
                Increment Pointer to Next Byte to
                      Transmit
                Add Byte to Transmit Checksum
            }
            ELSE
                Transmit the Checksum Byte
        }
    }
    ELSE
    {
        Save Received Byte
        Update Receive Checksum
    }
    Set Timer Interrupt for 20 Bit Times from
          Timer Reference
```

E.  Valid Checksum Byte Received in Wait Checksum State

Current State: Wait_Checksum
Event:         Valid Message Byte Received
Next State:    Wait_RxNACK
Actions:
```
        Set Timer Reference to Current Time
        Clear the Input Capture Flag
        Set Timer Interrupt for 20 Bit Times from Timer
              Reference
        Decrement the Error Counter by 32
```

F.  Timer Interrupt While in Wait RxNACK State

Current State: Wait_RxNACK
Event:         Timer Interrupt
Next State:    Wait_TxNACK
Actions:
```
        Clear the Input Capture Flag
        IF (Not Transmitting Current Message)
            Pass Received Message to Application
        Set Timer Interrupt for 51 Bit Times from Timer
              Reference
```

G.  Timer Interrupt While in Wait TxNACK State

Current State: Wait_TxNACK
Event:         Timer Interrupt
Next State:    Wait_Format
Actions:
```
        Clear the Input Capture Flag
        IF (Transmitting Current Message)
            Report Message Tx Complete
            Set Timer Interrupt for Max_Idle from Timer
                  Reference
        ELSE
        {
            IF (Message Waiting to Transmit)
            }
                IF (Retry Limit Not Reached)
                    Schedule Next Transmit Attempt
                ELSE
                    Set Timer Interrupt for Max_Idle from
                          Timer Reference
            }
            ELSE
                Set Timer Interrupt for Max_Idle from Timer
                      Reference
        }
```

H.  Timer Interrupt While in Wait_Format

State AND Message Waiting to Transmit
Current State: Wait Format
Event:         Timer Interrupt AND Pending Message Transmission
Next State:    Wait_Format
Actions:
```
        IF (Not at Error Limit)
        {
            IF (Edge Detect Not Set)
            {
                IF (Retry Attempt < Retry Limit)
                {
                    Transmit the Format Byte
                    Initialize the Transmit Checksum
                    Set "Transmitting Current Message" Flag
                }
                ELSE
                    Report Retry Limit Reached to
                          Application
            }
            ELSE
            {
                Set Timer Reference to Current Time
                Set Timer Interrupt for 10 Bit Times from
                      Current Time
            }
        }
```

I.  Timer Interrupt While in Wait_Format

State AND No Message Waiting to Transmit
Current State: Wait_Format
Event:         Timer Interrupt AND No Pending Message
                   Transmission
Next State:    Idle
Actions:
```
        Clear Sleep Timer
        Set Next Timer Interrupt for Maximum Timer
              Period
```

J.  Valid Format Byte Received While in Wait Format State

Current State: Wait_Format
Event:         Valid Format Byte Received
Next State:    Wait_Checksum
Actions:
```
        Set Timer Reference to Current Time
        Clear the Input Capture Flag
        IF (Transmitting Current Message)
        {
            IF (Received Byte = Format Byte Transmitted
                  AND Input Capture Flag Clear)
            {
                Transmit Target Byte
                Increment Pointer to Next Byte to
                      Transmit
                Add Target Byte to Transmit Checksum
            }
        }
        ELSE
        {
            Save Received Format Byte
            Initialize Receive Checksum
        }
        Set Timer Interrupt for 20 Bit Times from Timer
              Reference
```

ERROR PATHS

K.  Byte (Without Frame Error) Received While in Wait TxNACK State

Current State: Wait_TxNACK
Event:         Byte (Without Frame Error) Received While in
                   Wait_TxNACK State
Next State:    Wait_TxNACK
Actions:
```
        Clear Input Capture Flag
```

L.  Invalid Byte Received While in Idle State

Current State: Idle
Event:         Either of the Following Conditions Constitutes
                   an Invalid Byte Received Event:
                       1. The Received Byte Has a Frame Error;
                       2. This Node is Transmitting and the
                          Received Byte Does Not Match the
                          Transmitted Byte;
Next State:    Drive_Break
Actions:
```
        Disable UART
        Drive Tx Pin Passive
        Increment the Error Counter
```

-continued

```
                IF (Error Counter at 255)
                    Set Error Limit Flags (Prevents Bus
                        Transmission)
                ELSE
                {
                    Drive the Tx Pin Active (Start Break
                        Transmission)
                    Set Timer Reference to Current Time
                    Set Timer Interrupt for 10 Bit Times from
                        Timer Reference
                }
                IF (Transmitting Current Message)
                    Stop Transmitting
M.  Error Event While in the Wait Checksum State Current State: Wait_Checksum
Event:         Any One of the Follow Conditions Represents an
               Error Event Which Causes this
               Transition:
                   1. Invalid Byte (With Frame Error)
                      Received;
                   2. Invalid Checksum Received (Calculated
                      Checksum Doesn't Match Received
                      Checksum);
                   3. Timer Interrupt (indicates Timed Out
                      While Waiting for a Byte);
                   4. If Transmitting, Received Byte Doesn't
                      Match Transmitted Byte.
Next State:    Drive_Break
Actions:
               Disable UART
               Drive Tx Pin Passive
               Increment the Error Counter
               IF (Error Counter at 255)
                   Set Error Limit Flags (Prevents Bus
                       Transmission)
               ELSE
               {
                   Drive the Tx Pin Active (Start Break
                       Transmission)
                   Set Timer Reference to Current Time
                   Set Timer Interrupt for 10 Bit Times from
                       Timer Reference
               }
               IF (Transmitting Current Message)
                   Stop Transmitting
N.  Byte Received (With or Without Frame Error)

While in the Wait RxNACK State
Current State: Wait_RxNACK
Event:         Byte Received (With or Without Frame Error)
Next State:    Drive_Break
Actions:
               Disable UART
               Drive Tx Pin Passive
               Increment the Error Counter
               IF (Error Counter at 255)
                   Set Error Limit Flags (Prevents Bus
                       Transmission)
               ELSE
               {
                   Drive the Tx Pin Active (Start Break
                       Transmission)
                   Set Timer Reference to Current Time
                   Set Timer Interrupt for 10 Bit Times from
                       Timer Reference
               }
               IF (Transmitting Current Message)
                   Stop Transmitting
O.  Invalid Byte Received (With Frame Error)

While in the Wait TxNACK State
Current State: Wait_TxNACK
Event:         Byte Received (With Frame Error)
Next State:    Drive_Break
Actions:
               Disable UART
               Drive Tx Pin Passive
               Increment the Error Counter
                IF (Error Counter at 255)
                    Set Error Limit Flags (Prevents Bus
                        Transmission)
                ELSE
                {
                    Drive the Tx Pin Active (Start Break
                        Transmission)
                    Set Timer Reference to Current Time
                    Set Timer Interrupt for 10 Bit Times from
                        Timer Reference
                }
                IF (Transmitting Current Message)
                    Stop Transmitting
P.  Invalid Byte Received While in Wait Format State Current State: Wait_Format
Event:         Either of the Following Conditions Constitutes
               an Invalid Byte Received Event:
                   The Received Byte Has a Frame Error;
                   This Node is Transmitting and the Received
                   Byte Does Not Match the Transmitted Byte;
Next State:    Drive_Break
Actions:
               Disable UART
               Drive Tx Pin Passive
               Increment the Error Counter
               IF (Error Counter at 255)
                   Set Error Limit Flags (Prevents Bus
                       Transmission)
               ELSE
               {
                   Drive the Tx Pin Active (Start Break
                       Transmission)
                   Set Timer Reference to Current Time
                   Set Timer Interrupt for 10 Bit Times from
                       Timer Reference
               }
               IF (Transmitting Current Message)
                   Stop Transmitting
Q.  Timer Interrupt While in Drive Break State Current State: Drive_Break
Event:         Timer_Interrupt
Next State:    Wait_Break
Actions:
               Clear Input Capture Flag
               Drive Tx Pin Passive (Stop Driving Break)
               Re-initialize the UART
               Set Timer Interrupt for 20 Bit Times from Timer
                   Reference
R.  Timer Interrupt While in Wait Break State Current State: Wait_Break
Event:         Timer Interrupt
Next State:    Wait_Format
Actions:
               Subtract 20 Bit Times from Timer Reference to
                   Pull Ahead Next Transmit Attempts
               Clear the Input Capture Flag
               IF (Message Waiting to Transmit)
               {
                   IF (Retry Limit Not Reached)
                       Schedule Next Transmit Attempt
                   ELSE
                       Set Timer Interrupt for Max_Idle from
                           Timer Reference
               }
               ELSE
                       Set Timer Interrupt for Max_Idle from
                           Timer Reference
S.  Byte Received While in Drive Break State Current State: Drive_Break
Event:         Byte Received
Next State:    Drive_Break
Actions:
               IF (Byte Has Frame Error)
                   Increment Error Counter
```

| | |
|---|---|
| T. | Byte Received While in Wait Break State |
| Current State: | Wait_Break |
| Event: | Byte Received |
| Next State: | Wait_Break |
| Actions: | |
| | IF (Byte Has Frame Error) |
| | Increment Error Counter |

Relationship Between Message Waveforms and UBP States
Normal Communication

Figure 8:
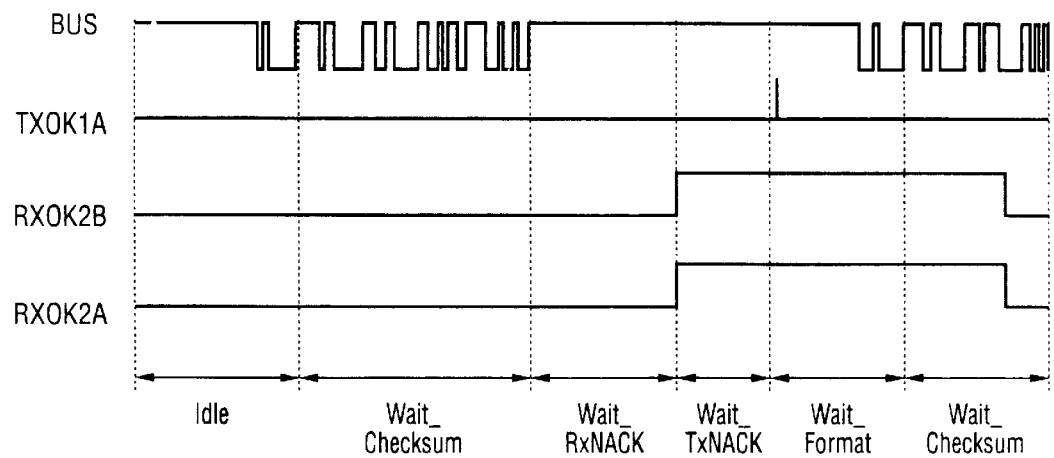
FIG. 8 shows message waveforms and logic states for normal communication.

A UBP message waveform along with additional diagnostic waveforms is shown in FIG. 8. In this waveform, node 1A is transmitting and nodes 2A and 2B are receiving node 1A's transmission. A pulse indicating where node 1A declares it message to have be successfully transmitted is incorporated into the UBP driver code. This point occurs at the rising edge of the signal "TXOK1A" and corresponds to the end of the transmitting node's Wait_TxNACK interval. The time from the end of the transmitted checksum byte to the rising edge of TXOK1A is 5.413 mS, which is approximately 51 bit periods at 104 uS per bit period. The point at which nodes 2A and 2B declare received messages to be valid occurs at the rising edge of signals "RXOK2A" and "RXOK2B", respectively. The time from the end of the transmitted checksum to the end of the Wait_RXNACK state is 2.199 mS which is approximately 20 bit periods at 104 uS per bit period.

ERROR MODE OPERATION

Figure 9:
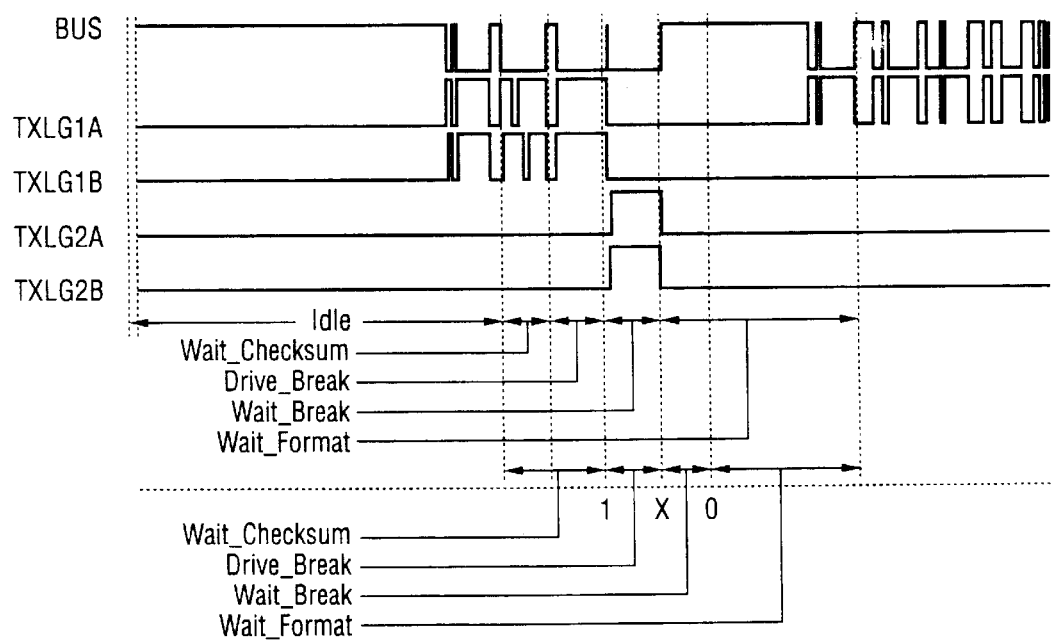
FIG. 9 shows message waveforms and logic states for error mode operation.

Waveforms demonstrating UBP's error mode operation are shown in FIG. 9 that represents a system for which there are 4 nodes on the bus; nodes 1A, 1B, 2A and 2B. FIG. 9 shows the waveform on the bus ("BUS") along with the logic signals driven out of the Tx pin of each of the individual nodes on the system (TXLGxx, where xx identifies which node) into the physical layer transmit pin of that specific node. The BUS signal is a composite waveform of the individual transmissions of each of the nodes on the bus such that any dominant signal transmitted by any single node overwrites any recessive state on the bus.

In the example of FIG. 9, two nodes (1A and 1B) are attempting to transmit simultaneously, resulting in a collision on the bus. In this case, both nodes are transmitting the same format byte, and so no node on the bus is able to detect any discrepancy, including the two transmitters, which each receive the same byte they transmitted. The second byte transmitted on the bus, the target byte, is different for the two transmitting nodes, and the resultant waveform on the bus due to the collision matches neither node 1A's nor node 1B's transmission. After receiving the second byte, both transmitters detect the discrepancy and transmit a Break signal (10 Bit Periods of dominant state). The second byte appears to be a valid byte to the two other receivers on the bus, nodes 2A and 2B. As a result, the two receivers only send Break signals as a result of and subsequent to nodes 1A and 1B transmitting Break signals.

As a node is sending its Break signal, it is in the "Drive_Break" state. After completing transmission of the Break, the node is in the "Wait_Break" state for 10 additional bit periods. Note that in this case, where the receivers do not detect an error until after the Break signals sent by the transmitters, there are periods during which transmitters and receivers on the bus are not in the same software states. After a Break is completed, the UBP implementation "pulls ahead" the time at which the node may attempt to transmit the next message by adjusting the timer reference value. However, a node must wait sufficiently long to allow other nodes to complete a Break sequence and enter the "Wait_Format" state so that they are able to properly receive the first byte of the next message. In this case, node 1A must wait sufficiently long after completing its Break sequence to allow the receivers, nodes 2A and 2B, to complete Break sequences and enter the "Wait_Format" state.

While the best mode for carrying out the present invention has been described in detail, those familiar with the art to which this invention relates will recognize various alternative designs and embodiments for practicing the invention as defined by the following claims.

What is claimed is:

1. A method of peer to peer asynchronous communication between a plurality of controllers coupled by a bus, each controller including a universal asynchronous receiver transmitter (UART), said method comprsing a sequence of the following steps by one of said plurality of controllers:

receiving at least a portion of a multi-byte message that was transmitted according to a UART Based Protocol;

detecting that the message is a corrupted version of an original uncorrupted message;

transmitting a negative acknowledgment signal in response to detecting said corrupted version thereby causing the bus to assume a dominant state for a predetermined time interval in order to abort the message in progress;

said negative acknowledgment signal overwriting a stop bit of a character frame;

said overwritten stop bit in any received byte being detected as a frame error by all of said plurality of controllers to thereby prevent the reception of said corrupted version by another of said plurality of controllers; and causing the bus to assume a recessive state at the end of said time interval.

2. The invention defined in claim 1 wherein both said original uncorrupted message and the corrupted version thereof were respectively transmitted and received by said one of said controllers;

said detecting step being performed by comparing the transmitted and received messages for any discrepancy; and after the bus assumes said recessive state, re-transmitting the original uncorrupted message.

3. The invention defined in claim 1 wherein said original uncorrupted message was transmitted by a first controller and said negative acknowledge signal was transmitted by a second controller.

4. The invention defined in claim 2 wherein said detecting step is performed by detecting a frame error for any received byte.

5. The invention defined in claim 3 wherein said original uncorrupted message includes a format byte incorporating a data length code, and said detecting step is performed by detecting that the number of received bytes is greater than the data length code.

6. The invention defined in claim 3 wherein said original uncorrupted message includes a format byte incorporating a data length code, and said detecting step is performed by detecting that the number of received bytes is less than the data length code.

7. The invention defined in claim 3 wherein said original uncorrupted message includes a checksum byte, and said detecting step is performed by detecting that the checksum byte is invalid.

8. The invention defined in claim 3 wherein said original uncorrupted message includes a header, a data field of a predetermined number of data bytes, and a checksum byte, said header comprising a format byte, a target byte, and a source byte.

9. The invention defined in claim 8 wherein certain bits of said format byte specify the message type as a functionally addressed message or a physically addressed message and certain other bits of said format byte specify the number of data bytes to be transmitted in the message.

10. The invention defined in claim 9 wherein a functionally addressed message is to be received if the target byte received by a node matches a pre-defined list of functional target bytes defined for that node.

11. The invention defined in claim 10 wherein a physically addressed message is to be received if the target byte received by a node matches the receiving node's source address.

12. The invention defined in claim 8 wherein said source byte identifies the unique address of the node which is the source of the transmitted message.

13. A method of peer to peer asynchronous communication between a plurality of controllers coupled by a bus, each controller including a receiver and a transmitter, said method comprising a sequence of the following steps:

transmitting an original uncorrupted multi-byte message from a first controller;

receiving at least a portion of said message by a second controller;

detecting that the received message is a corrupted version of said original message;

transmitting from said second controller a negative acknowledgment signal thereby causing the bus to assume a dominant state for a predetermined time interval to prevent the reception of said corrupted version by another of said plurality of controllers; and causing the bus to assume a recessive state at the end of said time interval;

wherein the transmission of the negative acknowledgment signal overwrites a stop bit of a character frame;

and wherein said overwritten stop bit is detected as a frame error for any received byte.

14. The invention defined in claim 13 wherein said original uncorrupted message Includes a header, a data field of a predetermined number of data bytes, and a checksum byte, said header comprising a format byte, a target byte, and a source byte, all bytes occurring within a predetermined time interval of each other, said interval being sufficient to accommodate the worst case stack up of maximum allowable interrupt latencies and worst case time base tolerance associated with each node on said bus.

15. A method of peer to peer asynchronous communication between a plurality of controllers coupled by a bus, each controller including a receiver and a transmitter, said method comprising a sequence of the following steps by one of said plurality of controllers:

receiving at least a portion of a multi-byte message;

detecting that the message is a corrupted version of an original uncorrupted message;

transmitting a negative acknowledgment signal thereby causing the bus to assume a dominant state for a predetermined time interval to prevent the reception of said corrupted version by another of said plurality of controllers;

causing the bus to assume a recessive state at the end of said time interval; and removing a controller from the bus if a predetermined error criteria is reached in order to prevent continuous alternation of said dominant and recessive states.

16. The invention defined in claim 15 wherein the error criteria includes;

determining an error value equal to the number of negative acknowledgement signals transmitted offset by the number of successfully received messages and wherein the controller is removed from the bus if said error value exceeds a predetermined limit.

17. A method of peer to peer asynchronous communication between a plurality of controllers coupled by a bus, each controller including a receiver and a transmitter, said method comprising a sequence of the following steps:

transmitting an original uncorrupted multi-byte message from a first controller;

receiving at least a portion of said message by a second controller;

detecting that the received message is a corrupted version of said original message;

transmitting from said second controller a negative acknowledgment signal thereby causing the bus to assume a dominant state for a predetermined time interval to prevent the reception of said corrupted version by another of said plurality of controllers;

causing the bus to assume a recessive state at the end of said time interval and;

removing a controller from the bus if a predetermined error criteria is reached in order to prevent continuous alternation of said dominant and recessive states.

18. A method of peer to peer asynchronous communication between a plurality of controllers coupled by a bus, each controller including a receiver and a transmitter, said method comprising a sequence of the following steps:

transmitting an original uncorrupted multi-byte message from a first controller;

receiving at least a portion of said message by a second controller;

detecting that the received message is a corrupted version of said original message;

transmitting from said second controller a negative acknowledgment signal thereby causing the bus to assume a dominant state for a predetermined time interval to prevent the reception of said corrupted version by another of said plurality of controllers;

causing the bus to assume a recessive state at the end of said time interval;

determining an error value equal to the number of negative acknowledgment signals transmitted offset by the number of successfully received messages and;

removing a controller from the bus if said error value exceeds a predetermined limit.

* * * * *